(12) United States Patent
Highsmith et al.

(10) Patent No.: US 6,610,157 B1
(45) Date of Patent: Aug. 26, 2003

(54) PRILLED ENERGETIC PARTICLES, AND PROCESS FOR MAKING THE SAME

(75) Inventors: Thomas K. Highsmith, North Ogden, UT (US); Harold E. Johnston, Brigham City, UT (US)

(73) Assignee: Alliant Techsystems Inc., Edina, MN (US)

( * ) Notice: Subject to any disclaimer, the term of this patent is extended or adjusted under 35 U.S.C. 154(b) by 129 days.

(21) Appl. No.: 09/759,594

(22) Filed: Jan. 12, 2001

Related U.S. Application Data
(60) Provisional application No. 60/176,011, filed on Jan. 14, 2000.

(51) Int. Cl.[7] .............................................. C06B 21/00
(52) U.S. Cl. ..................................... 149/109.6; 264/3.4
(58) Field of Search ......................... 149/109.6; 264/3.4

(56) References Cited

U.S. PATENT DOCUMENTS

| | | | |
|---|---|---|---|
| 5,071,630 A | * 12/1991 | Oberth | 423/266 |
| 6,074,581 A | * 6/2000 | Wood et al. | 264/14 |
| 6,135,746 A | * 10/2000 | Wood et al. | 425/6 |
| 6,136,115 A | 10/2000 | Highsmith et al. | |

FOREIGN PATENT DOCUMENTS

| WO | WO 99/01408 | 1/1999 |
|---|---|---|
| WO | WO 99/21793 | 5/1999 |

\* cited by examiner

*Primary Examiner*—John Hardee
(74) *Attorney, Agent, or Firm*—TraskBritt

(57) ABSTRACT

A process for producing prills containing an energetic material other than ammonium dinitramide (ADN) or ammonium nitrate (AN), is performed in a prilling column having at least one heated zone and at least one cooling zone. Solid particulate feedstock of the energetic material is introduced into said prilling column and allowed to fall through the heated zone and form melted particles as pre-prills. A countercurrent flow of inert fluid medium is sufficient for spheridization of the pre-prills into spherical pre-prills. The spherical pre-prills pass through the cooling zone in the prilling column, in which the spherical pre-prills harden into prills, while excessive condensation in the cooling zone is avoided. The prills are then collected.

19 Claims, No Drawings

PRILLED ENERGETIC PARTICLES, AND PROCESS FOR MAKING THE SAME

CROSS-REFERENCE TO RELATED APPLICATION

The benefit of priority is claimed based on provisional application Ser. No. 60/176,011 entitled "Prilled Energetic Particles, and Process for Making the Same" filed in the U.S. Patent & Trademark Office on Jan. 14, 2000, the complete disclosure of which is incorporated herein by reference.

GOVERNMENT LICENSE RIGHTS

The U.S. Government has a paid-up license in this invention and the right in limited circumstances to require the patent owner to license others on reasonable terms as provided for by the terms of Contract No. 00174-95-C-0078 awarded by the Department of the Navy.

BACKGROUND OF THE INVENTION

1. Field of the Invention

The present invention is directed to a spheridization process for producing prills of energetic materials other than ammonium dinitramide ("ADN") or ammonium nitrate ("AN"). More particularly, the present process produces solid at least essentially spherically-shaped particles ("prills") of energetic materials, with the capability of tailoring the relative modality, e.g., particle size distribution, of the prills. The present invention further relates to the prilled particles, and energetic formulations containing the prills, such as, for example, solid propellants and explosives.

2. Description of the Related Art

Traditional prilling methods contemplate melting a material in bulk. However, this creates a hazardous situation particularly with energetic materials. For instance, an uncontrolled exothermic event would rapidly propagate with an energetic material in a bulk melt. Even the effective preparation of a bulk melt can prove difficult due to accumulation of vapor under pressure in the material.

Therefore, despite advancements provided in the art, there remains a need for a commercially practical process for producing prills comprised of energetic material other than AN or ADN.

SUMMARY AND OBJECTS OF THE INVENTION

It is therefore an object of the present invention to overcome the above-mentioned problems and address the above-identified art-recognized needs by providing a prilling process for forming prilled particles from a variety of selected energetic materials as the principle component, in which the instability of the energetic component, as a neat ingredient, may be reduced, if not eliminated.

It is a further object of the present invention to provide propellant compositions and formulations including the prills.

In addition to the advantageous properties exhibited by the resultant prills, the present process further offers the manufacturing advantage of being able to produce the prills in different grades, i.e., different particle sizes. This manufacturing advantage facilitates the effective use of a selected grade of the energetic material in the formulation of propellants. That is, the present process can yield prilled products with improved morphology, including significantly and unexpectedly high uniformity based on a tailorable particle size distribution basis, with the consequent desirable benefit of improved safety in comparison to conventionally produced products. A further related advantage that can be attained by preferred variants of the invention is producing a prilled product which, in principle, may be less detonable than conventionally produced particulate energetic materials.

The present process, in its preferred embodiment, produces a prilled product exhibiting enhanced processability and a higher bulk density. Markedly lower mix viscosity, improved homogeneity of resultant products (prills and propellants containing prills), high bulk density, few voids in prills, and enhanced resistance to humidity, depending on the energetic material selected, are among the additional advantages that can be achieved by the present invention. Resistance to humidity simplifies and may, in some applications, eliminate special handling of ingredients and of propellants containing the present prills.

High prilling efficiencies are also an object of the present invention. Prilling efficiencies of 99% or more are in principle obtainable.

The present process also makes it possible to obtain prills which have an apparent bulk density which may be approximately comparable to the theoretical crystal density, and in general, the bulk density can be readily at least about 98–99% of the theoretical crystal density.

It is another object of the present invention to provide prilled energetic particles, and especially spheroidally-shaped prills, suitable for use in formulating solid propellant compositions. The present invention therefore further encompasses propellant formulations incorporating the present prilled products, and methods of making the propellant formulations.

These and other objects, features, and advantages of the present invention will become more apparent from the following detailed description of the invention.

DETAILED DESCRIPTION OF THE INVENTION

As used herein, energetic material means a relatively thermodynamically unstable, kinetically stable material, excluding either or both of ammonium nitrate (AN) and/or ammonium dinitramide (ADN). Such energetic materials can include fluorinated and/or nitrated materials. Suitable energetic materials include nitramines (e.g., TNAZ) or materials having nitramine functionality; nitroarenes, including trinitro cresol (mp 107° C.), nitrophenoxyalkyl nitrate (the alkyl being, for example, methyl or ethyl (mp 104.5° C.)), trinitroxylene (mp 182° C.), hexanitrodiphenylglycerol mononitrate (mp 160° C.), and nitronaphthalenes, including trinitronaphthalene (mixed isomers, mp 115° C.); and hydrazines including hydrazinium nitroformate, hydrazine nitrate (stable polymorph 70° C.), and hydrazine perchlorate (mp 144° C.); di-nitro azoxy furazan; and trinitro toluene (TNT). Non-melting nitramines such as RDX and HMX are not preferred. In general, suitable energetic materials can be selected from those described in R. Meyer et al., Explosives, VCH Press (1993) and in Akhavan, *The Chemistry of Explosives* (RCS 1998). Suitable unstabilized energetic materials generally have a decomposition temperature that is sufficiently greater than their melting point. This is for safety reasons. The decomposition temperature of an unstabilized energetic material may be, for example, at least approximately 50° C. higher than the melting point. A narrower difference between the melting point and the decomposition temperature on the order of 38° C. is possible. An even narrower difference is feasible, particularly if the energetic material is stabilized. Thus, for instance, a melting point in a range of 80° C. to 200° C. is in principle suitable provided that the decomposition temperature is sufficiently greater than the melting point.

In one embodiment, feedstock for preparing the prills is introduced into a feeder, such as a hopper or comparable device. The hopper can be loaded with the selected amount of the feedstock. The feedstock is preferably in a selected relatively fine particulate form. It is preferred that the feedstock not be compacted in the hopper. Hence, it is preferred that the depth of the feedstock bed which can form in the hopper be limited. Other feeder devices, such as screw feeders or the like, can be used.

The morphology of the feedstock can, if desired, be selected to reduce variations in process parameters which may affect prill sizes and distribution. The feedstock is preferably dry, or at least essentially dry, if hygroscopic energetic material is used. Moisture is not desired for hygroscopic materials. However, the presence of moisture is less critical for non-hygroscopic energetic materials.

The energetic material for the prilling feedstock can be prepared by crystallization to a desired particle size. The shape of the individual particles in the prilling feedstock is not critical. The total volume of the crystals will be reflected in the prilled product. Accordingly, even crystals with a high aspect ratio (length/width) can be used as the prilling feedstock.

The profile of the feedstock introduced into the prilling column does affect the profile of the prilled product produced. In order to ensure that the feedstock satisfies any particle size distribution requirements, the feedstock can optionally be pre-screened prior to being introduced into the feeder. Generally, the feedstock is in finely divided and unconsolidated particulate form and can have a mean particle size in a range of from about 20 $\mu$m to about 300–400 $\mu$m, although larger mean particle sizes can, in principle, be used. Preferably the feedstock has a mean particle size in a range of up to about 40 $\mu$m, although for preparing other prill grades, larger mean particle sizes can be used. Feedstock having a mean particle size on the order of up to about 180 $\mu$m or larger can be used. The size distribution of the resultant prills may be directly influenced by feed size. Hence, the relative mean particle size for the feedstock, and the distribution about that selected mean particle size, can be used to control the relative mean particle size and distribution in the resultant prilled products. For instance, the relative mean particle size distribution of the feedstock can be narrowed about the approximate mean particle size in the prilled product. Thus, the latter mean particle size is about the same in the feedstock, but with a narrower distribution.

The energetic material added to the hopper can contain, if desired, at least one selected thermal stabilizer, such as a nitrogen-containing organic stabilizer, of which urea and/or a mono- and/or a poly-hydrocarbon urea derivative, such as 1,1-dialkylurea and/or 1,3-dialkylurea, are exemplary.

By preference, in the hydrocarbon-containing urea derivatives, the hydrocarbon groups contain 1 to 10 carbon atoms, more preferably 1 to 6 carbon atoms, and can be straight chain, branched or cyclic (including aryl). When a urea derivative contains more than one hydrocarbon group, each group can be the same or different from the other group(s). Thus, with the poly-alkyl-substituted urea stabilizers, each alkyl group can be the same or different. Suitable alkyl groups can be independently selected, and include, among others, methyl, ethyl, n-propyl, i-propyl, n-butyl, i-butyl, t-butyl, pentyl, cyclopentyl, hexyl, cyclohexyl, octyl, nonyl and decyl. Suitable aryl groups include phenyl, among others. Thus, for instance, 1,1-dimethyl urea, 1,3-dimethyl urea and N,N'-diethyl and N,N'-diphenyl urea can be used.

The concentration of selected thermal stabilizer, e.g., a nitrogen-containing stabilizer such as urea, in the prilled product can be controlled via the amount of stabilizer introduced in the formulation of the feed stock. For example, the thermal stabilizer can be used in a range of from about 0.1% to about 5% by weight, preferably in a range of from about 0.25% to about 2% by weight, and more preferably in a range of from about 0.5% to about 1.25% by weight (of feedstock or of the prill weight).

The feedstock can contain, if desired, at least one $NO_x$ scavenging agent. Exemplary such $NO_x$ scavenging agents include 2-nitrodiphenyl amine, 4-nitrodiphenylamine, and N-methylnitroaniline, among others. Suitable scavenging agents, if used, can be selected for a chosen energetic material. The amount of scavenging agent can broadly be in a range of about 0 wt. % to about 5 wt. %, with amounts in a range of about 2 wt. % to 5 wt %, or in a range of 0.5 wt % to 1 wt. % being possible if greater scavenging is required. If used, the $NO_x$ scavenging agent is preferably present in an amount greater than 0 wt. % but less than approximately 0.25 wt. %. The wt. % is relative to the weight of the feedstock or prill weight.

The amount of $NO_x$ scavenging agent, thermal stabilizer or other nonenergetic ingredient used may reduce the energy density of the final prilled products. The desired energet density may be considered in determining whether to use these ingredients and selecting the amounts used.

In one embodiment, the selected stabilizer and/or scavenger can be added with a suitable solvent to the energetic material during a purification or crystallization step prior to introducing the feedstock into the feeding device, e.g., hopper or the like. Suitable such solvents include $CH_3CN$, ethers, MTBE, ethyl acetate, heptane (n-heptane or a mixture of heptanes), hexane (n-hexane, cyclohexane, or a mixture of hexanes), alkanols (such as methyl alcohol, ethyl alcohol, i-propyl or n-propyl alcohol, butyl alcohol (t-butyl, n-butyl or i-butyl alcohol)) and a mixture of any such suitable solvents.

The unexpected improvements that may be seen with the stabilizer-containing feedstock can be demonstrated by simulated bulk auto ignition testing ("SBAT"), which consists of a procedure in which a 0.5 gram sample in a test tube is placed in a heated block. The heat rate of the block was 24° F./hour for ramped experiments to a selected temperature ceiling, such as 500° F. The isothermal data were obtained using the sample in the heated block with a test tube. A thermocouple was positioned within the sample. The thermal events, and in particular the onset of decomposition, for the samples were monitored as a function of time. SBAT data can be used to benchmark the feed in the heating zone.

In general, samples can be prepared by mixing the feedstock with the selected stabilizer, such as a urea-type stabilizer. No special apparatus is required for this mixing.

Agglomeration in the feeding apparatus is undesired. Therefore, one or more additives, such as those disclosed hereinbelow and others, can be added to avoid agglomeration and to impart other beneficial characteristics to the final prilled product. Thus, the feedstock added to the hopper preferably can also contain a processing aid, such as a finely divided silica-type product. The silica-type product is mixed into the energetic material to obtain a blend which, by present preference, is an essentially homogeneous blend. Also by preference, the selected energetic material, thermal stabilizer and additive, such as a processing aid and/or scavenging agent, are mixed in a relatively short, but sufficient, time to achieve a desired homogeneity. In general, mixing times on the order of minutes, such as 1–2 minutes, in principle are satisfactory in the preparation of feedstock for producing modest-sized lots of prills. Excessively long mixing times are not presently preferred.

V-shell type blenders can be used to effect this mixing for small lot sizes, and can also be used to layer (kilogram) lot sizes. In addition, static mixers can, if desired, be used to achieve solid-solid mixing of a selected solid energetic material, thermal stabilizer and other additives (such as the processing aid).

Examples of finely divided silica, such as fumed silica include, without limitation, commercially available fumed silica, such as Tulanox or Cab-O-Sil® brand fumed silica. The fumed silica can have different surface areas per unit weight. For instance, the Cab-O-Sil® brand grades of fumed silica include the TS-720 (100 $m^2$/g), TS-610 (120 $m^2$/g) and TS-530 (200 $m^2$/g) grades and untreated grades, such as, L-90 (100 $m^2$/g), LM-130, LM-150, M5 (PTG M-7D) (200 $m^2$/g), MS-55 (255 $m^2$/g), H-5 (300 $m^2$/g), HS-5 (325 $m^2$/g) and TH-5 (380 $m^2$/g). Although not particularly limited, the surface area of a suitable fumed silica type product can be from about 100 $m^2$/gram to about 400 $m^2$/gram. In addition, some metal oxides, such as ZnO or MgO can be used as processing aids. It is, however, desirable to have the processing aid well dispersed in the feedstock before forming the pre-prills.

The amount of processing aid can vary, but in general an amount which is capable of maintaining the mixture unconsolidated and free-flowing can be used in formulating the feedstock. Processing aids can be used alone or in combination. A small but effective amount of the selected processing aid, such as an amount sufficient for preventing caking (agglomeration etc.), is preferred. Such amounts can generally be in a range of about 0.25 wt. % to about 5 wt. %, but smaller amounts in the range of about 0.5 wt. % to about 1.5 wt. % based on the weight of the selected energetic material in the feedstock can also be used.

A small but effective amount of a processing aid can also serve to protect feedstock, specially if it is hygroscopic, from caking or deliquescence at a high humidity, such as 70% relative humidity (Rh). For instance, incorporating about 1.0 wt. % Cab-O-Sil® in certain hygroscopic feedstocks may enable the feedstocks to remain free-flowing solids even after 200 hours at 70% Rh. The treated feedstock can, in principle, re-equilibrate to initial weight under reduced humidity conditions.

Satisfactory prills are obtainable using feedstock to which was added 0.5 wt. % of a fumed silica (such as a Cab-O-Sil® brand silica) and 0.5 wt. % of stabilizer (such as urea).

By preference, in one embodiment, the feedstock is well-mixed in the feeder. Alternatively, or in addition thereto, a separately prepared feedstock, including stabilizer and additive(s), can introduced into the feeder.

The present process is advantageously conducted while avoiding the conventional reservoir of fertilizer melt as commonly used in fertilizer prilling processes. Rather, the solid feedstock from the hopper is introduced into the prilling column. By preference, the melt is formed in the prilling column as the particles fall by the force of gravity through a heated or hot zone of the prilling column while being counter current to an inert fluid media which is introduced into the bottom of the prilling column. For small lot sizes, such as less than a kilogram, the feedstock can be fed to the present prilling column at about 1 to 5 grams/minute. Higher feed rates can be achieved. However, regardless of the feed rate, it is desirable to have unconsolidated particles. For instance, with larger particles and faster feed rates, so-called prilling plates can be installed, if desired, at the top of the prilling column before the hot zone so that the particles are not consolidated. While in the hopper, the feedstock is preferably at a temperature which is sufficiently low to avoid agglomeration and reduce the potential for degradation.

In the present process, the elapsed time in which the energetic material is at an elevated temperature is relatively short. The residence time at an elevated temperature can be as short as about 5 seconds, and generally less than about 1 second. The actual residence time required depends on the particle size of the prills being generated, and the heat of melting of the energetic material. The time the material is in a melted state is much shorter than commonly encountered in the conventional prilling process where the material would be melted in bulk and forced through a spray head. The temperature in the hot zone will be dictated by the melting point of the energetic material to be prilled and limited by its decomposition temperature.

In the present process, an inert fluid is drawn through the prilling column in upward, countercurrent flow with respect to the falling energetic material containing droplets (pre-prills). The inert fluid medium can comprise at least one inert gas, including by example and without limitation, noble gases, such as argon, helium, neon, nitrogen and $N_2O$. In principle, dry air can be used. In principle, even steam can be used for energetic material that is neither hygroscopic nor reactive with water.

The fluid media can be introduced in a lower section of the prilling column, and preferably at a selected position below the inlet for a cooling zone. Although not required, fines or other debris that become entrained in the upward fluid flow can, if desired, be subsequently removed with filters or other particle separators. The filtered fluid media can be recycled for further use. Likewise, the filtered fines can be recycled to prepare feedstock and thereby improve the efficiency of the overall process.

The fluid media can be introduced at a selectable pressure or within a selectable pressure range. The selected pressure is generally sufficiently low to avoid creating excessive turbulent upward flow of the fluid media. Such excessive turbulence can cause prills forming in the prilling column to collide with each other or impact the interior surfaces of the prilling column, which can adversely affect the morphology of the resulting prills. On the other hand, in general, the pressure should be sufficient to ensure spheridization (prill formation) while avoiding excessive turbulence in the prilling column. The fluid media can also function to transfer heat, e.g. function as a thermal conductor, and can serve to exclude moisture from the prilling environment. The fluid media is preferably dry. Pressures in the order of about 1 to about 2 atmospheres should be satisfactory in small scale production.

The present process can, if desired, include a so-called cooling or cold zone for freezing out, e.g. solidifying, the melted droplets falling through the prilling column. The cold zone is generally designated with reference to the section of the column that is capable of being cooled, such as by cooling jackets, cooling coils, etc. Residence time within the cold zone can, if desired, be on the order of from about milli seconds to about 10 seconds, with the duration being largely a function of fluid media flow in the column, the prill size, and the column height. The hot and cold sections of the prilling column can be designed to control the duration of the exposure in each section. Prills can be obtained using a prilling apparatus in which the estimated duration of the cooling was approximately half that of the estimated duration in the hot zone.

The hot and cold sections of the prilling apparatus can therefore be designed to permit the duration of the exposure to the selected temperatures. In one embodiment, the top to bottom length of the cold zone can be approximately 50% of the length of the hot zone. In that embodiment, the residence time of the particles (pre-prills or prills) in the cold zone is less than 50% of the residence time within the hot zone simply because the rate at which the particles fall through the prilling column will increase due to gravity. Therefore, by taking into account the effects of gravity and the fluid media flow, a prilling column can be provided which has the desired relative residence times in the hot and cold zones respectively.

In general, the cold zone can be at a temperature in a range which is sufficient to form hard prills, while avoiding excessive condensation, such as from about from sub-zero° C. to below the melting point of the energetic material. A relatively warmer cooling temperature can be used to effect a slower freezing/prilling. At present, the critical factor is a cooling temperature below the melting point of the material selected. A suitable target temperature range for the cold zone can be readily established and maintained for a particular column. It is desired to avoid condensation collecting within the prilling column. In an embodiment, a cold zone can be established by wrapping a cooling coil around the periphery of a section the prilling column. A selected cooling medium can be circulated within the cooling coil.

The respective temperatures in the hot and cold zones can be regulated by controlling the temperatures and recirculation rates of the media used to heat and cool the prilling column. The fluid media in the column itself can also be monitored and controlled based, for instance, on output from a thermocouple in the fluid medium flow within the column (prill tower).

The prilling column can be thermally insulated to improve the energy efficiency of the column.

The prilling column height, and thus the falling distance, the velocity of the inert cooling fluid, and, if used, the temperature of the hot and cooling zones are adjusted so that the prills are sufficiently hard, e.g., robust, when they strike the surface of the prill collector. Generally, when viewed in reference to this disclosure, the selection of these and other parameters relating to the configuration and size of the prilling column and components thereof would be apparent to the skilled artisan without undue experimentation.

The prilled particles exiting the cold zone (cooling zone or a cooling section) are then collected in a prill collector. By preference, the prills do not impact a flat surface perpendicular to their gravity-directed prilling path. For instance, on a pilot plant scale, the prills can exit the prilling column, for example, via an arcuately shaped tube. This enables collection of prills while reducing prill fracturing, avoiding particles rebounding back into the upward fluid flow, and avoiding excessive inter-prill collisions during the collection process. Inter-prill impacts can deform, fracture or coalesce particles, depending on the stage of the present process.

The prilled product discharged at the lower portion of the prilling column can be further cooled and, if desired, screened. Prilled or a screened-prilled product can be used in other energetic applications, including those described elsewhere herein, as well as by those described in Alain Davenas, Solid Rocket Propulsion Technology, Pergammon Press NY (1993) pages 369–525; Dobratz et al., LLNL Explosives Handbook, Properties of Chemical Explosives and Explosives Simulants, University of California Press (1985), the complete disclosures of which is incorporated herein by reference. The fines passing through the screen can be recycled.

The mean particle size distribution in the present prilled products can be tailored. For instance, relatively tailored ballistic performance and mechanical properties of the prilled products are achievable with the present process because a narrow mean particle size distribution on a mono- or multi-modal basis is now available. Multi-modal particle sizes, including bi-modal particles with narrow mean particle size distributions, such as those in the range of about 30 $\mu$m to 40 $\mu$m and about 110 $\mu$m to about 200 $\mu$m, offer the further advantages of formulating a denser propellant. In general, packing as in a standard missile or a shuttle is bi-modal to enhance packing density. Spaces between larger particles can be filled with smaller prills.

Prills can have an apparent bulk density comparable to crystals, and are less prone to fracture, are thermally more robust, and may be safer. Depending on the prill composition, the prill may also be less hydroscopic than the energetic material neat. Prills made from even feedstock comprised of hydroscopic energetic material also can exhibit improved properties.

Card gap is proportional to shock pressure. Card gap tests indicate an unexpected significant increased safety margin for detonation with the products of the present process. This means an increase in pressure for detonation. Card gap testing is disclosed in PCT Application PCT/US98/13583, the disclosure of which is incorporated herein by reference. The importance of an increase in card gap is described in Rudol Meyer, Explosives, Verlag Chemie, N.Y. (3d ed. 1987), the disclosure of which is incorporated herein by reference. The significant improvement is indicative of the particle quality, including being void-free or at least essentially void free and having few if any defects.

The present prills have capable flexibility and improved thermodynamic stability, and show improved sensitivity. Processability is also improved from a number of perspectives, including rheology. The prills contain crystals, where the energetic material is crystallizable, having improved aspect ratios.

In principle, propellants formulated with the present prilled particles are capable of out-performing, from the ballistics standpoint, comparably formulated propellant compositions containing energetic particles which were obtained by conventional processes.

The present prilled particles can be usefully employed in a variety of propellant compositions and with a variety of binder formulations. Non-energetic binders, energetic binders, or a combination thereof can be usefully employed in formulating the propellant compositions. Binder systems for propellant formulations *The Chemistry of Explosives* (RCS 1998) and include, among others, substituted oxetane polymers, nitramine polymers, polyethers, and polycaprolactones (any of which can be plasticized or non-plasticized). Exemplary suitable binders include hydroxy-terminated polybutadiene (HTPB), poly(glycidyl nitrate) (PGN), poly (nitratomethylmethyl-oxetane) ("poly-NMMO"), glycidyl azide polymer ("GAP"), diethyleneglycoltriethyleneglycolnitraminodiacetic acid terpolymer ("9DT-NIDA"), poly(bisazidomethyl-oxetane) ("poly-BAMO"), poly-azidomethyl-methyloxetane ("poly-AMMO"), poly(nitraminomethyl-methyloxetane) ("poly-NAMMO"), copoly-BAMO/NMMO, copoly-BAMO/AMMO, polybutadieneacrylonitrile acrylic acid terpolymer ("PBAN"), nitrocellose and a mixture of any of these. These formulations will typically include a curative appropriate for the binder. For example, a polyisocyanate curing agent is typically used with polyglycidyl nitrate, polyoxetanes, polyglycidyl azide, hydroxy-terminated polybutadienes, and polyethers (polypropylene glycol and polyethylene glycol), whereas an epoxy curing agent is typically used with other binders such as PBAN. It is understood, however, that the present invention is not limited to these curing agents. However, the prills produced by this invention may advantageously react with the polyisocyanates at a slow, more manageable rate. Hence, reactive sites of the polyisocyanate remain available for reaction with the uncured binder.

A composition comprised of the present energetic prills and binder can be used as a propellant. Suitable propellant formulations include composite propellants. For instance, composite formulations can additionally include a reactive metal or metalloid, such as aluminum, beryllium, boron, magnesium, zirconium, silicon or mixtures or alloys thereof and, optionally, further ingredients. Suitable propellant formulations, including composite formulations, which can be adapted for use with the present prills are disclosed in Alain Davenas, Solid Rocket Propulsion Technology, Pergammon Press NY (1993), including pages 369–525, the disclosure of which is incorporated herein by reference. For example, the composite formulations can be adapted as needed for the prills through, for instance, higher solids loading.

The present prills can be surface coated, if desired.

The following example serves to explain embodiments of the present invention in more detail. The example is not to be construed as being exhaustive or exclusive as to the scope of this invention.

EXAMPLE

An exemplary prill preparation is readily illustrated as follows. 10 grams of an energetic material is provided as 100 microns mean sized particles as a feedstock. A suitable such material feedstock is DNAP (4,4'-dinitroazoxyfurazan from synthesis using following preparation: Trudell, M. L.; Gunasekaran, A.; Boyer, J. H. Heteroatom Chemistry, Volume 5, page 441 (1994) having a melting point of 110–112° C. and the stated mean particle size). The DNAF feedstock is introduced into a prilling column which is characterized as being approximately 5 cm in diameter and as having an approximately 122 cm long hot zone and an approximately 61 cm long cold (freezing) zone. An inert gas comprises the fluid media introduced in countercurrent fashion into the prilling column. Argon is an exemplary such gas. For DNAF, the heated zone gas temperature can be 140° C. and the cold zone gas temperature can be 0° C. The DNAF feedstock is fed at one half gram per minute into the prilling column. The spherical DNAF particles obtained can have a very nearly theoretical crystal density of 1.91 g/cc. The elimination of defects and regular spherical surface inhibits hot spot formation and therefore greatly diminishes friction and impact sensitivity of the product.

The foregoing detailed description of the invention has been provided for the purpose of explaining the principles of the invention and its practical application, thereby enabling others skilled in the art to understand the invention for various embodiments and with various modifications as are suited to the particular use contemplated. This description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A process for producing prills comprised of an energetic material having a melting point, the energetic material being free of ammonium dinitramide and ammonium nitrate, said process comprising:

providing a solid particulate feedstock comprising an energetic material;

providing a prilling column, said prilling column having at least one heated zone, and at least one cooling zone;

introducing said solid particulate feedstock into said prilling column and allowing said solid particulate feedstock to fall through the at least one heated zone along a flow path to form melted particles as pre-prills;

providing a countercurrent flow comprising an inert fluid medium in said prilling column in a countercurrent direction to the flow path of the pre-prills, the countercurrent flow being sufficient for spheridization of the pre-prills into spherical pre-prills, while avoiding excessive turbulence within the prilling column;

allowing the spherical pre-prills to pass through the at least one cooling zone in the prilling column, the at least one cooling zone being at an operation temperature sufficient to harden the spherical pre-prills into prills while avoiding excessive condensation in the at least one cooling zone, the operation temperature being below the melting point of the energetic material; and collecting the prills.

2. A process according to claim 1, further comprising selecting the energetic material to comprise a compound having a nitramine functionality.

3. A process according to claim 1, further comprising selecting the energetic material to comprise a nitroarene.

4. A process according to claim 3, further comprising selecting the nitroarene to comprise at least one member selected from the group consisting of trinitro cresol, nitrophenoxyalkyl nitrate, trinitroxylene, hexanitrodiphenylglycerol mononitrate, and trinitronaphthalene.

5. A process according to claim 1, further comprising selecting the energetic material to comprise a hydrazine.

6. A process according to claim 5, further comprising selecting the hydrazine to comprise at least one member selected from the group consisting of hydrazinium nitroformate, hydrazine nitrate, and hydrazine perchlorate.

7. A process according to claim 1, further comprising selecting the energetic material to comprise dinitro azoxy furazan.

8. A process according to claim 1, further comprising selecting the energetic material to comprise trinitro toluene.

9. A process according to claim 1, further comprising selecting the energetic material to have a decomposition temperature at least approximately 50° C. higher than the melting point of the energetic material.

10. A process according to claim 1, further comprising selecting the energetic material to have a decomposition temperature at least 38° C. higher than the melting point of the energetic material.

11. A process according to claim 1, further comprising selecting the melting point of the energetic material to be in a range of 80° C. to 200° C.

12. A process according to claim 1, further comprising selecting the inert fluid medium to comprise a member selected from the group consisting of an inert gas, dry air, and steam.

13. A process according to claim 1, further comprising selecting the solid particulate feedstock to comprise an organic nitrogen-containing thermal stabilizer.

14. A process according to claim 13, further comprising selecting the organic nitrogen-containing thermal stabilizer to comprise at least one member selected from the group consisting of urea, a mono-hydrocarbon urea derivative, and a poly-hydrocarbon urea derivative.

15. A process according to claim 1, further comprising adding at least one $NO_x$ scavenging agent.

16. A process according to claim 15, wherein adding the at least one $NO_x$ scavenging agent comprises adding at least one member selected from the group consisting of 2-nitrodiphenyl amine, 4-nitrodiphenylamine, and N-methylnitroaniline.

17. A process according to claim 16, further comprising forming the prills to consist of about 0.25 wt. % to about 5 wt. % of the at least one $NO_x$ scavenging agent.

18. A process according to claim 16, further comprising forming the prills to consist of about 2 wt. % to 5 wt % of the at least one $NO_x$ scavenging agent.

19. A process according to claim 1, further comprising providing the solid particulate to comprise a processing aid.

* * * * *

UNITED STATES PATENT AND TRADEMARK OFFICE
CERTIFICATE OF CORRECTION

PATENT NO. : 6,610,157 B1
DATED : August 26, 2003
INVENTOR(S) : Thomas K. Highsmith and Harold E. Johnston It is certified that error appears in the above-identified patent and that said Letters Patent is hereby corrected as shown below:

Title page, Item [54] and Column 1, lines 1 and 2,
Title, before "PRILLED" insert -- PROCESS FOR PRODUCING -- and change "PARTICLES, AND" to -- PARTICLES -- ; and delete $2^{nd}$ line in its entirety Column 1,
Line 22, delete "1."
Line 33, delete "2. Description of the Related Art"
Line 34, insert -- State of the Art: --
Line 46, before "SUMMARY" insert -- BRIEF -- and delete "AND OBJECTS"
Line 49, change "It is therefore an object of the" to -- The -- and at the end of the line, delete "to"
Line 50, change "overcome" to -- addresses -- and delete "address"
Line 56, change "It is a further object of the" to -- The -- and change "to provide" to -- provides --

Column 2,
Line 8, change "its preferred" to -- one --
Line 19, change "an object of" to -- obtainable using --
Line 25, change "the" to -- a -- and change "can be readily" to -- of --
Line 26, after "density" and before the period insert -- may be achieved --
Line 27, change "It is another object of the" to -- The -- and change "to provide" to -- also provides --
Line 34, delete "objects,"
Line 41, change "energetic material" to -- "energetic material" --

Column 4,
Line 30, change "energet" to -- energetic --

Column 5,
Lines 18, 20, 47 and 53, change "®" to -- $^{®}$ --
Line 44, change "specially" to -- especially --
Line 58, after "can" and before "introduced" insert -- be --

Column 7,
Line 34, after "section" and before "the" insert -- of --

Column 8,
Line 8, after "which" change "is" to -- are --
Line 67, change "diethylenegly" to -- diethylene-gly --

UNITED STATES PATENT AND TRADEMARK OFFICE
CERTIFICATE OF CORRECTION

PATENT NO. : 6,610,157 B1
DATED : August 26, 2003
INVENTOR(S) : Thomas K. Highsmith and Harold E. Johnston It is certified that error appears in the above-identified patent and that said Letters Patent is hereby corrected as shown below:

Column 9,
Line 6, change "polybutadieneacrylonitrile" to -- polybutadiene-acrylonitrile --
Line 46, change "DNAP" to -- DNAF --

Column 10,
Line 10, delete "comprised of an ener-"
Lines 11 and 12, delete the line in its entirety
Line 13, delete "said process"
Line 15, after "material" insert -- having a melting point, the energetic material being free of ammonium dinitramide and ammonium nitrate --
Lines 36, 39, 41, 46, 48, 52, 54, 56, 60 and 64, change "A" to -- The --

Column 11,
Lines 1, 5, 8 and 13, change "A" to -- The --

Column 12,
Lines 1, 6, 9 and 12, change "A" to -- The --

Signed and Sealed this

Tenth Day of May, 2005

JON W. DUDAS
*Director of the United States Patent and Trademark Office*